US009595264B2

(12) United States Patent
Jacob et al.

(10) Patent No.: US 9,595,264 B2
(45) Date of Patent: Mar. 14, 2017

(54) AUDIO SEARCH USING CODEC FRAMES (71) Applicant: Avaya Inc., Santa Clara, CA (US)

(72) Inventors: John Jacob, Malvern (GB); Keith Ponting, Malvern (GB); Wendy J. Holmes, Malvern (GB)

(73) Assignee: Avaya Inc., Santa Clara, CA (US)

( * ) Notice: Subject to any disclaimer, the term of this patent is extended or adjusted under 35 U.S.C. 154(b) by 174 days.

(21) Appl. No.: 14/506,955

(22) Filed: Oct. 6, 2014

(65) Prior Publication Data
US 2016/0098999 A1    Apr. 7, 2016

(51) Int. Cl.
| | |
|---|---|
| G06F 17/27 | (2006.01) |
| G06F 17/28 | (2006.01) |
| G10L 19/00 | (2013.01) |
| G10L 25/51 | (2013.01) |
| G10L 15/08 | (2006.01) |
| H04M 3/493 | (2006.01) |

(52) U.S. Cl.
CPC .............. *G10L 19/00* (2013.01); *G10L 25/51* (2013.01); *G10L 15/08* (2013.01); *H04M 3/4936* (2013.01)

(58) Field of Classification Search
CPC . G10L 19/00; G10L 19/0001; G10L 19/0002; G10L 19/0004; G10L 19/0007; G10L 19/0008; G10L 19/0013; G10L 19/0016; G10L 19/02; G10L 15/02; G10L 15/20
USPC ....... 704/201, 243, 222–223, 256, 226, 220, 704/255, 230
See application file for complete search history.

(56) References Cited

U.S. PATENT DOCUMENTS

| | | | | |
|---|---|---|---|---|
| 4,717,261 A | * | 1/1988 | Kita | ........................ G10L 19/00 365/45 |
| 4,718,087 A | * | 1/1988 | Papamichalis | .......... H03M 7/42 704/222 |
| 6,347,297 B1 | * | 2/2002 | Asghar | ................... G10L 15/02 704/232 |

(Continued)

OTHER PUBLICATIONS

"Coding of speech at 8 kbit/s using conjugate-structure algebraic-code-excited linear prediction (CS-ACELP)," Series G: Transmission Systems and Media, Digital Systems and Networks, Digital terminal equipments—Coding of voice and audio signals, International Telecommunication Union, ITU-T Recommendation G.729, 2012, 152 pages.

(Continued)

*Primary Examiner* — Marivelisse Santiago Cordero
*Assistant Examiner* — Stephen Brinich
(74) *Attorney, Agent, or Firm* — Sheridan Ross P.C.

(57) ABSTRACT

To detect events in an audio stream, frames of an audio signal (e.g., frames generated by a codec for a voice call or music stream) are received. Based on information in the frames, an index is used to look up an entry in a table associated with the codec. Each entry in the table indicates a likelihood that a frame matches a sound model element. The likelihood is used in the search for a sound bite, word, and/or phrase in the audio signal. The process of dynamic programming is used to find the combined likelihood for a match of the word, phrase, and/or sound bite to a region of the audio stream. Upon detection of the word, phrase, and/or sound bite in the audio stream, an event is generated, such as, notifying a person or logging the event in a database.

20 Claims, 7 Drawing Sheets

(56) References Cited

U.S. PATENT DOCUMENTS

| | | | | |
|---|---|---|---|---|
| 6,415,255 | B1* | 7/2002 | Cohen | G10L 19/16 |
| | | | | 704/221 |
| 6,782,362 | B1* | 8/2004 | Hon | G10L 15/14 |
| | | | | 704/240 |
| 2002/0116196 | A1* | 8/2002 | Tran | G06F 1/3203 |
| | | | | 704/270 |
| 2010/0329466 | A1* | 12/2010 | Berge | H04R 3/12 |
| | | | | 381/22 |

OTHER PUBLICATIONS

Kraaij et al., "Phoneme based Spoken Document Retrieval," Proceedings of the fourteenth Twente Workshop on Language Technology TWLT-14, University of Twente, 1998, pp. 141-153.

Rigoll et al., "A Comparison between Continuous and Discrete Density Hidden Markov for Cursive Handwriting Recognition," Proceedings of the 13th International Conference Pattern Recognition, vol. 2, pp. 205-209.

"Technical Specification: Digital cellular telecommunications system (Phase 2+); Universal mobile telecommunications system (UMTS); LTE; Mandatory Speech CODEC speech processing functions; Adaptive Multi-Rate (AMR) speech codec; Transcoding functions," Sophia-Antipolis: European Telecomm. Standards Institute, 2012, 57 pages.

"9-2 Discrete HMM," retrieved from http://mirlab.org/jang/books/dcpr/hmmDiscrete.asp?title=9-2%20Discrete%20HMM, [retrieved Jan. 5, 2015], 5 pages.

* cited by examiner

| SOUND MODEL ELEMENT 400 | LIKELIHOOD % 401 |
|---|---|
| PHONEME A – STATE A | 2 |
| PHONEME A – STATE N | 5 |
| PHONEME B | 90 |
| PHONEME C – STATE A | 1 |
| PHONEME C – STATE N | 2 |
| PHONEME D | 10 |
| PHONEME N | 8 |
| SOUND PART A | 1 |
| SOUND PART N | 3 |

AUDIO SEARCH USING CODEC FRAMES

TECHNICAL FIELD

The systems and methods disclosed herein relate to audio processing systems and in particular to detection of a word or sound in an audio signal or an audio component of a video signal.

BACKGROUND

Today, there are a variety of systems that enable the detection of a word or phrase spoken in an audio signal. The first step in digital processing of any analog audio signal is to convert it to a sampled digital form. For signals of telephone bandwidth, typically 8000 16-bit waveform samples are taken per second, resulting in a "linear pulse code modulated" (linear PCM) representation. If the signal is to be transmitted over a telecommunications network, further analysis of the signal may be used to reduce the bit rate required while retaining as much speech intelligibility as possible. The signal is encoded into a lower bit rate form, transmitted and then decoded, with the encoding and decoding algorithms together described as a "codec".

A phoneme is a sound unit in a language that is capable of conveying a change of meaning. For example, the English words sing and ring differ in the first phoneme. A single phoneme may represent different letters in a language. For example, in English, the k in key and the c in car are regarded as the same phoneme because the sound for both letters is the same when spoken. Different languages have different sets of phonemes.

Audio search systems typically work in two phases. If the signal has been encoded for transmission it is decoded to linear PCM representation and then processed as if it had never been encoded. An initial "indexing" phase is applied as the signal is received or as soon as convenient thereafter. The second phase is when a search of the audio is required—one or more search terms are supplied and the system uses the stored "index" data to locate occurrences of those search terms in the audio. The index data may be stored between indexing and search or may be streamed from an indexing process into a search process.

Some audio search systems take an audio signal and use Large Vocabulary Continuous Speech Recognition (LVCSR) as the indexing phase, resulting in a text representation of the audio content. The text representation is usually more than a simple text transcript—it may include time markers and alternative transcriptions for parts of the audio signal. Based on the text representation of the audio signal, at search time the system can detect a specific word or phrase spoken in the audio signal. One drawback to these types of systems is that a large amount of processing resources is necessary to process an audio signal in real-time. A second is that any errors made by the LVCSR system will limit the accuracy of all subsequent searches involving affected words.

Other systems take a different approach. The indexing phase computes "distances" representing the similarity of each short time-slice of the audio to one or more models. Each model corresponds to a phoneme or part of a phoneme. These distances are then stored in an index file. At search time, arbitrary phrases may be entered and compared to the stored distances, resulting in "search hits" for the specified phrase, where each hit comprises a phrase identity, location and match score. Although much less than required for LVCSR indexing, significant processing resource is required by this approach during the indexing phase. Further, it can produce an index file that is sometimes larger than the audio signal, thus resulting in the use of large amounts of disk space if a large quantity of audio data is analyzed and stored.

Both of the above approaches involve statistical models previously trained on large amounts of speech. Typically these are hidden Markov models (HMMs) based on phonemic transcriptions of the training speech. Each model comprises one or more "states" and each state has an associated statistical distribution over a "feature" space corresponding to a representation of possible input audio. Many variants on this theme are known—in particular:

(i) A phoneme can comprise a sequence of distinct acoustic segments. For example, a pronunciation of the phoneme for the letter t in English has up to three distinct segments that are together perceived as the sound corresponding to the letter t. By analogy with this, the hidden Markov models typically used to represent and detect phonemes in audio search systems are constructed with multiple states for each phoneme.

(ii) The models may be built using different levels of detail other than the phoneme, including word level or any "sub-word" level such as syllable, demi-syllable, phoneme, sub-phoneme etc.

(iii) A given system may include models at more than one of these levels—one key benefit of using sub-word models is that such models may be combined in order to match and search for words which are not included in the training data.

(iv) The models may take account of context, so that for example different models may be used for the vowels in the English words "bad" and "bat"—this is typical of LVCSR systems and results in a much larger total number of states in the system.

(v) There may be sharing (or "tying") of parameters among the models in many different ways—in particular, multiple HMM states may share a given probability distribution.

(vi) Although usually described in terms of speech, similar approaches and models may be used for non-speech sound patterns, such as music.

Whatever model structure is chosen, there is a set of sound model elements, each represented by a distinct probability distribution and a key component of the indexing algorithms is the assessment of similarity—generating a numeric "score" which reflects how well each successive short time-slice (or "frame") of incoming audio data matches each of the (possibly very many) sound model elements. That assessment is typically in the form of "distances" (where smaller distances represent better matches) or "likelihoods" (where smaller likelihoods represent worse matches). The computation of these scores requires significant processing resource, even in those LVCSR systems which employ sophisticated algorithms to restrict the computation for each time frame to some subset of the possible probability distributions.

The search need not be restricted to words or phrases. One or more instances of any sound segment (speech, non-speech or a combination) may be captured and used to build a single hidden Markov model in order to search in incoming audio data for further occurrences similar to that segment/those segments. The term "sound bite" is used in this document for such an approach. As for sub-word HMMs, the searching process requires considerable resource to compute scores reflecting the similarities between incoming sound frames and states of the target model(s). (The use of single instances to represent models is also known in the art as "template matching". It is known that template matching is a special case of hidden Markov modeling, wherein there is a one-to-one correspondence between frames of the template and states of a single HMM which represents the whole sound segment, each state represents a unique sound model element and the corresponding probability distributions have a particularly simple form.)

SUMMARY

Systems and methods are provided to solve these and other problems and disadvantages of the prior art. To detect events in an audio stream, frames of an audio signal (e.g., frames generated by a codec for a voice call or music stream) are received. Based on information in the frames, an index is used to look up an entry in a table associated with the codec. The entry indicates the similarities between that frame and a plurality of sound model elements represented by probability distributions within the system. The similarities are used in a search for a sound bite, word, and/or phrase in the audio signal. Upon detection of the word, phrase, and/or sound bite in the audio stream, an event is generated, such as notifying a person or logging the event in a database.

DETAILED DESCRIPTION

Figure 1:
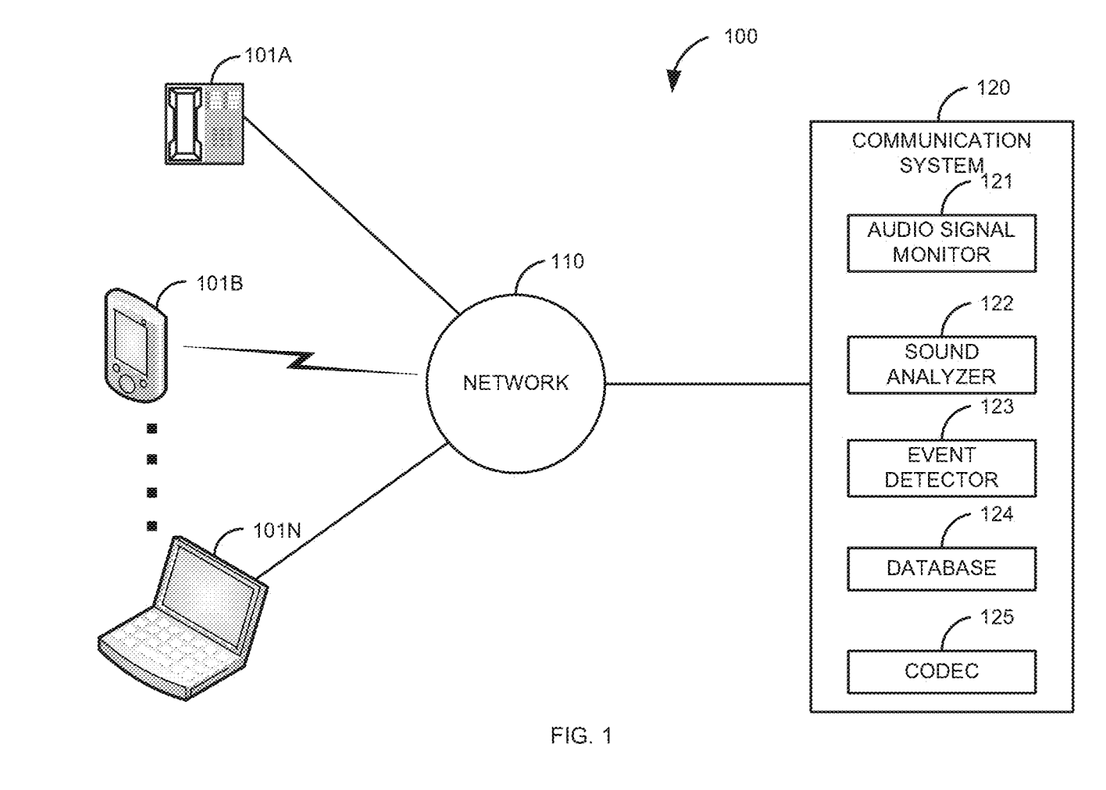
FIG. 1 is a block diagram of a first illustrative system for searching an audio signal.

FIG. 1 is a block diagram of a first illustrative system 100 for searching an audio signal. The first illustrative system 100 comprises communication devices 101A-101N, a network 110, and a communication system 120.

The communication devices 101A-101N can be or may include any device that can communicate on the network 110, such as a Personal Computer (PC), a telephone, a video system, a cellular telephone, a Personal Digital Assistant (PDA), a tablet device, a notebook device, an audio server, a video server, and/or the like. As shown in FIG. 1, any number of communication devices 101A-101N may be connected to the network 110, including only a single communication device 101. In addition, the communication device 101 may be directly connected to the communication system 120.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The communication system 120 can be or may include any collection of equipment that can provide communication services on the network 110, such as a central office switch, a Private Branch Exchange (PBX), a router, a proxy server, a session border controller, a session manager, and/or the like. The communication system 120 comprises an audio signal monitor 121, a sound analyzer 122, an event detector 123, a database 124, and a codec 125.

The audio signal monitor 121 can be or may include any hardware/software that can be used to monitor an audio signal, such as Digital Signal Processor (DSP), a microcontroller, digital signal processing software, a combination of these, and the like. The audio signal monitor 121 can monitor frames received from the codec 125, frames received from a codec 125 in the communication devices 101A-101N, and/or the like.

The sound analyzer 122 can be or may include any hardware/software that can be used to process audio information, such as Digital Signal Processor (DSP), a microcontroller, digital signal processing software, a combination of these, and the like. The sound analyzer 122 can process information in an audio signal to extract short time-slices or frames from and to compute match scores between each audio frame and a plurality of sound model elements within the system.

The event detector 123 can be or may include any hardware/software that can detect events within the audio signal, such as events associated with a sound bite, a word, and/or a phrase within the audio signal. Based on the event detected in the audio signal, the event detector 123 can respond in various ways.

The database 124 can be any type of database 124 for storing information, such as a relational database, a directory service, a hierarchical database, a file system, a file, and/or the like. The database 124 can be used to store information associated with the audio signal, such as lookup tables, detected events, user preferences, and/or the like.

The codec 125 can be any hardware/software that can decode the audio signal, such as a DSP, a microcontroller, digital signal processing software, and/or the like. In some embodiments, the codec 125 may also be able to encode an audio signal. The codec 125 can support various protocols, such as G.711, G.729, G.729A, G.723.1, G.722, G.728, Speex, Low Delay Audio Coder (AAC-LD), Code Excited Linear Prediction (CELP), OPUS, SILK and/or the like.

Although the elements 121-125 are shown in the communication system 120, the elements 121-125 may be distributed between the communication system 120 and other devices within the network 110. For example, the database 124 may reside on a server in the network 110. Alternatively, the elements 121-125 may reside in one or more of the communication devices 101 where the processing of the audio signal is implemented within the communication device 101.

Figure 2:
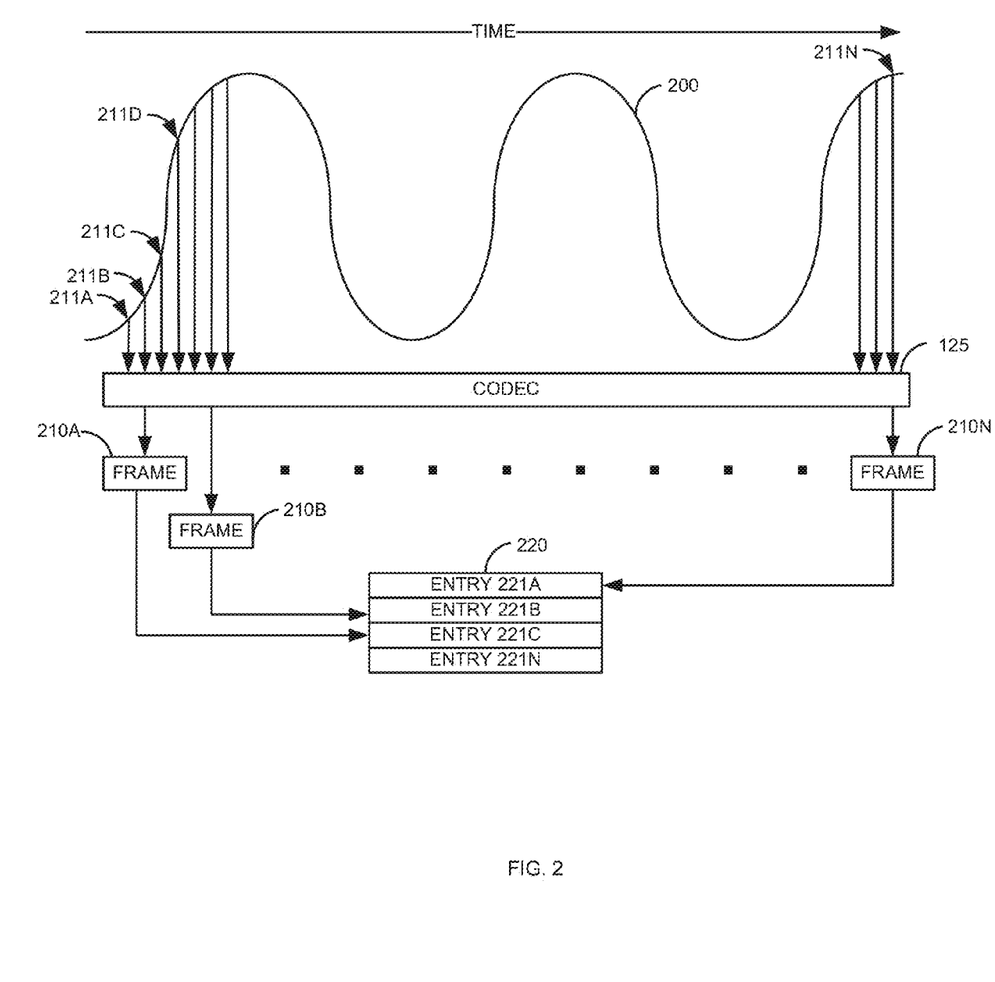
FIG. 2 is a diagram that illustrates the extraction from an audio signal of distances to be used as part of an audio search system.

FIG. 2 is a diagram that illustrates the extraction from an audio signal of distances to be used as part of an audio search system. FIG. 2 comprises the codec 125, an analog audio signal 200, frames 210A-210N, sample points 211A-211N, and lookup table 220.

The audio signal 200 may be an analog audio signal or the digitized equivalent indicated by the sampling points 211A-N on the diagram. The audio signal 200 can be an audio signal 200 that is generated by a microphone or like device within one of the communication devices 101A-101N. The audio signal 200 can be an audio signal that is part of a voice communication session between two or more of the communication devices 101A-101N. The audio signal 200 can be based on an audio signal 200 stored in digital form in the database 124. The audio signal 200 in FIG. 2 is shown over a time period.

The input analog audio signal is sampled, with sequences of samples making up the audio frames. The audio frames are converted to the frames 210A-210N by the codec 125. The frames 210A-210N may be created by combining multiple audio frames. In addition, various compression algorithms may be used to further reduce the amount of information in the frames 210A-210N.

For example, the frames 210A-210N can be frames from a G.729A codec 125 that generates an 80 bit frame 210 for every 10 milliseconds of the audio signal 200. It should be appreciated that other types of codecs (e.g., a codec other than G.729) may be used as codec 125.

The sample points 211A-211N are points in time where the codec 125 samples the audio signal 200 to generate a frame 210. The codec 125 can sample the audio signal multiple times to produce the frame 210. The sample points 211A-211N are shown to illustrate how the codec 125 samples the audio signal 200. The sample points are not necessarily drawn to scale. For example, a G.729A codec 125 would have more sample points than are shown in FIG. 2 for each frame 210A-210N.

The lookup table 220 is a table that is used to determine if information in the frames 210A-210N indicate a likelihood of the frame 210A-210N matching a sound model element. The likelihood of a frame matching a sound model element js typically represented as a distance. A distance indicates how close the sound model element is in relation to the current frame 210 that is being sampled. A larger distance corresponds to a lower likelihood.

Figure 4:
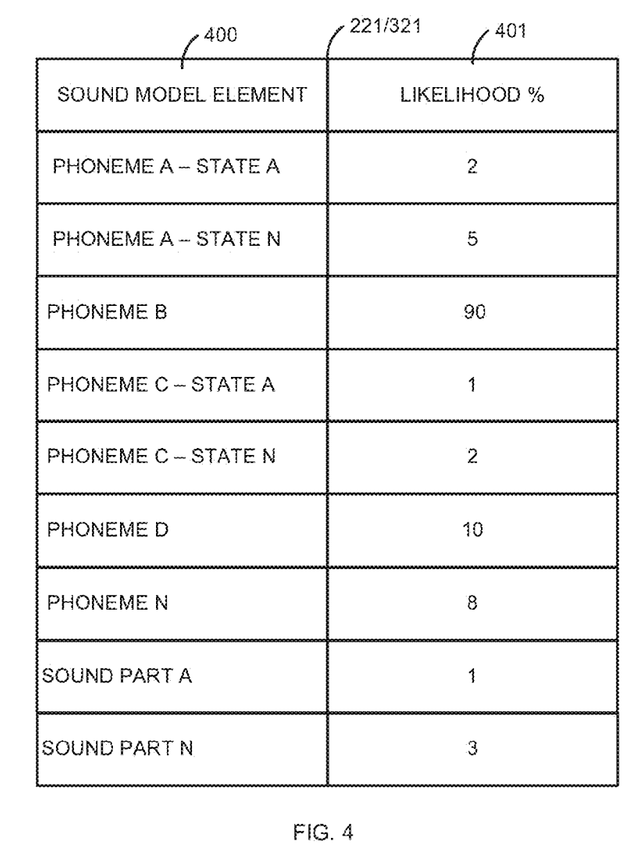
FIG. 4 is a diagram of an entry in a lookup table for obtaining distances for a frame of an encoded audio signal.

The lookup table 220 comprises entries 221A-221N. The lookup table 220 can comprise two or more entries 221. The entries 221A-221N can include information regarding a sound model element and a distance and/or likelihood of the frame 210A-210N matching the sound model element (e.g., as shown in FIG. 4). The lookup table 220 can be implemented in various forms, such as, shown in FIG. 4, in an Extended Markup Language (XML) format, in a flat file, using a database structure, and/or the like.

The codec 125 receives the audio signal 200. The codec 125 may be either in the communication device 101 or in the communication system 120. The codec 125 samples the audio signal 200 at sample points 211A-211N. The codec 125 generates the frames 210A-210N based on the sampled audio signal 200. In this embodiment, the sample point 211D is overlapping in frame 210A and 210B (e.g. how it is accomplished in G.729A). However, in other embodiments, the sample points 211 do not have to be in overlapping frames 210.

The audio signal monitor 121 receives the frame 210A from the codec 125. The sound analyzer 122 indexes into the entries 221A-221N in the lookup table 220 based on the frame 210. For example, the frame 210A may have a number that represents the sample points within the frame 210A. The number in the frame 210 is used to index into the entries 221A-221N in the lookup table 220. In this exemplary embodiment, frame 210A indexes into entry 221C in the lookup table 220. This process is repeated for frame 210B. The number from frame 210B indexes into entry 221B in the lookup table 220 Likewise, the process is repeated until frame 210N (which is the last frame in the audio signal 200). Frame 210N indexes into entry 221A.

When the sound analyzer 122 indexes into the entries 221A-221N in the lookup table 220, the entries 221A-221N indicate a set of distances between the frame 210 and each possible sound model element. Those distances are used in further stages of the search processing as described in relation to FIG. 5. This process continues for each frame until the end of the audio signal 200 is reached or a real-time search is otherwise terminated.

To illustrate, consider the following example. A supervisor in a call center wants to detect certain words in a voice call from customers to an agent in the call center. The supervisor wants to be notified if the word "bad" is spoken in the voice call by a customer. The word "bad" may be represented as a sequence of seven sound model elements as follows. The letter b has two sound model elements (b1 and b2). The letter a has three sound model elements (a1, a2, and a3). The letter d has two sound model elements (d1 and d2). In this implementation, the corresponding sequence of phoneme states is (b1 b2 a1 a2 a3 d1 d2). This example uses a short phrase for simplicity of exposition—in practice longer search phrases are preferable as they can be detected more accurately. The audio signal monitor 121 receives the frames 210 of the audio signal for the voice call. For each such frame 210, the likelihoods from the corresponding lookup table 221 are used by the sound analyzer 122. The sound analyzer 122 may use an efficient process, very well known in the art, known as "dynamic programming" to compute a composite score based on the individual frame distances for the best match of each sequence of frames to the target sequence of (seven in this example) phoneme model states. If the composite score exceeds a threshold then the event detector 123 notifies the supervisor that a good match for the word "bad" has been found in that call. The notification may also include timing information, so that the supervisor can locate the region of interest in the audio signal.

The matching process considers all possible start and end times and allows multiple consecutive frames to correspond to each model state. Therefore the match for "bad" in the example given is not required to be exactly seven frames in duration—a score is computed for matching "bad" to frames 210A-210G, 210A-210H, 210B-210H and so on for all possible sequences of at least seven frames.

This is accomplished by maintaining a set of active "hypotheses" or partial matches, where a hypothesis comprises: "history" information; a score and an index denoting the position in the model state sequence to which that score relates. As each new time frame is received, a new set of active hypotheses is obtained by propagating and competing existing hypotheses and the possibility of a new match starting at the current time frame. The competition ensures that at any one time frame, there is at most one hypothesis per model state. In the case of "bad", there are at most seven active hypotheses and the score for being in position 1 (b1) at the current time frame is the likelihood that the frame matches b1 combined with the better of:

(i) the score for being in position 1 at the previous time frame;

(ii) a "new match" hypothesis starting at the current frame.

For the non-initial positions, the score is computed from the set of previously active hypotheses. For example, the score for being in position 3 (a1) is the likelihood that the frame matches a1 combined with the better of:

(i) the score for being in position 3 (a1) at the previous time frame;

(ii) the score for being in position 2 (b2) at the previous time frame.

As is well known in the art, the score update may also:
(i) incorporate a "transition" probability of remaining at the same position and/or of moving on to the next position;
(ii) be modified to penalize or to completely prevent excessively long hypotheses by making such transition probabilities depend on the hypothesis history;
(iii) be set to discard ("prune") hypotheses with poor absolute or relative scores.

In some implementations, the search may be allowed to skip over one or more phoneme states from the sequence corresponding to the search phrase. Multi-word search phrases such as "I want to speak to your supervisor" may be used. Alternative pronunciations for one or more of the search phrase constituent words may also be allowed. Therefore, in practice the matches are computed using a "finite state network" rather than a simple sequence of states representing the sound model elements. Despite the resulting plethora of possibilities, the dynamic programming algorithm can efficiently compute and compare all possible matches.

The per-frame sound model element distances may be looked up for every requested search or looked up once and stored in an "index" file for later use in searching. As described, the system uses only a single codec frame to obtain the sound model element distances. It would also be possible to use a lookup table based on multiple consecutive frames and/or the frame interpolation information embedded in certain codec representations to take account of a wider time context.

The system may also detect frames that represent the silence in between words. These frames may be deleted and/or ignored. The silence frames may be removed and/or ignored when detecting a phrase, or they may contribute to the detection of that phrase.

In another embodiment, instead of using phonemes, parts of a sound can be used. For example, to detect a sound bite for a musical composition, frames in other formats can be analyzed in the same manner.

Figure 3:
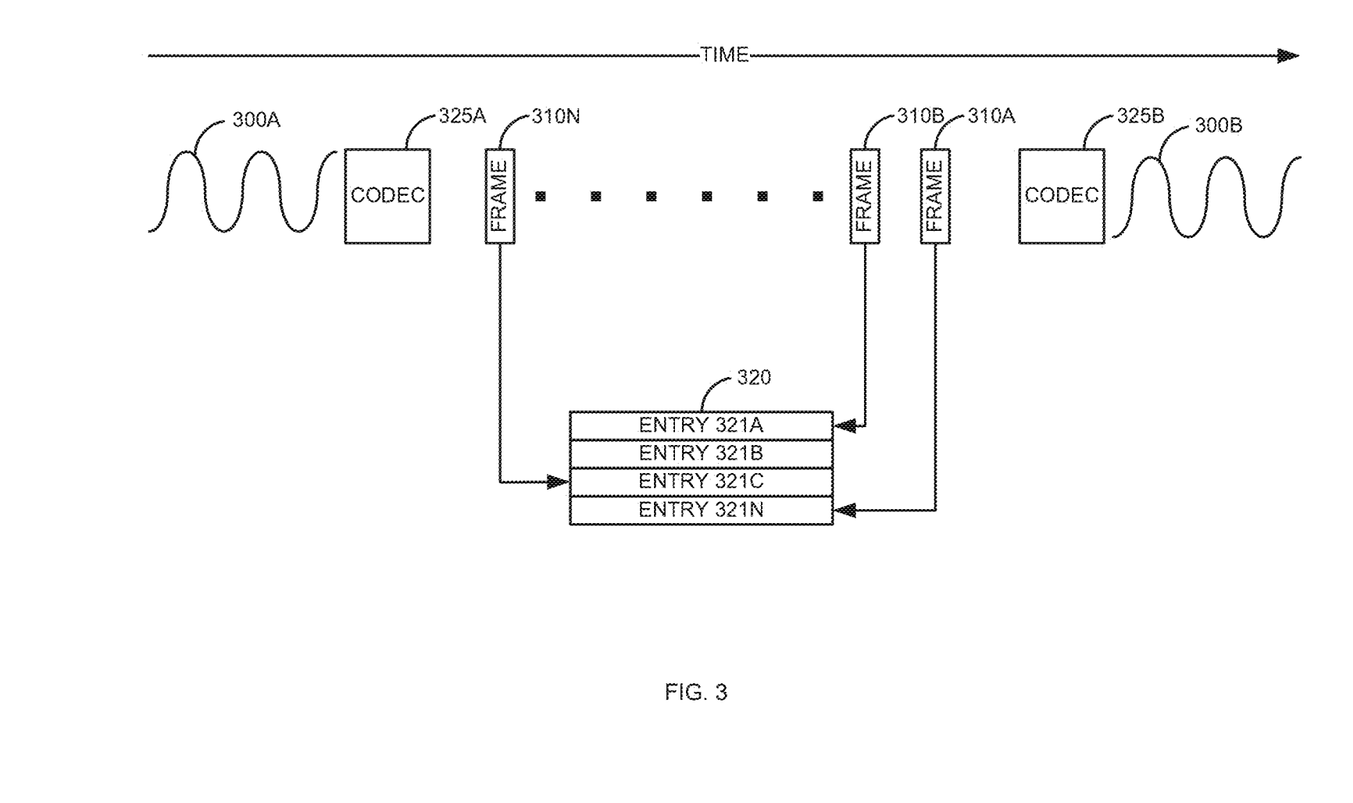
FIG. 3 is a diagram that illustrates the extraction from a live voice communication link of distances to be used as part of an audio search system.

FIG. 3 is a diagram that illustrates the extraction from a live voice communication link of distances to be used as part of an audio search system. FIG. 3 includes analog audio signals 300A and 300B, codecs 325A and 325B, frames 310A-310N, and table 320. In FIG. 3, table 320 may be the same table 220 or a different table 320 from FIG. 2.

FIG. 3 illustrates a live voice communication between two communication devices 101. The communication devices 101 each contain a codec (325A and 325B). The codec 325A receives the analog audio signal 300A. The codec 325A encodes the analog audio signal 300A into frames 310A-310N. The codec 325A sends the frames 310A-310N to the codec 325B. The codec 325B decodes the frames 310A-310N into the analog audio stream 300B. This process can also be repeated in the other direction for the second half of the voice communication. It should be appreciated that the decoder in the codec 325B must be able correctly to interpret the bit stream transmitted by the encoder in the codec 325A and vice versa; subject to that constraint, the codec 325A may be the same as codec 325B or the codecs 325A, 325B may be different codecs.

As discussed in FIG. 2, the sound analyzer 122 indexes into the entries 321A-321N to determine a likelihood of matching a sound model element that is included in a word, phrase, or sound bite that is being searched for in the audio stream 300.

FIG. 4 is a diagram of an entry 221/321 in a lookup table 220/320 for identifying likelihoods/distances corresponding to sound model elements for an audio signal 200/300. The entry 221/321 contains a list of sound model elements 400 and a likelihood 401 for each sound model element. As discussed above, the likelihood may be represented as a distance. A large distance corresponds to a low likelihood. The phonemes in the list of sound model elements 400 show different phonemes (phonemes A-N). The phonemes A-N do not necessarily correspond to letters in an alphabet, but are used for illustrative purposes. As discussed previously a model for a phoneme may have multiple states each corresponding to a single sound model element. For example the models for phonemes A and C have states A-N. The models for phonemes B, D, and N only have a single state. For the purposes of illustration, this table uses phoneme states as the labels for sound model elements—other implementations, including sharing sound model elements among the phoneme model states, are possible as discussed in the Background section. Although not shown, the entry 221/321 will have an identifier that is used to match to information in a frame 210/310.

The likelihood 401 for each sound model element indicates the likelihood of matching the corresponding sound model element. For example, phoneme B has a likelihood of 90%. Phoneme D has a 10% likelihood of being matched. Phoneme states A-N, phoneme C states A-N and phoneme N each have a lower % likelihood of matching. Sound Part A and sound part N have a 1% and 3% likelihood of matching.

Figure 5:
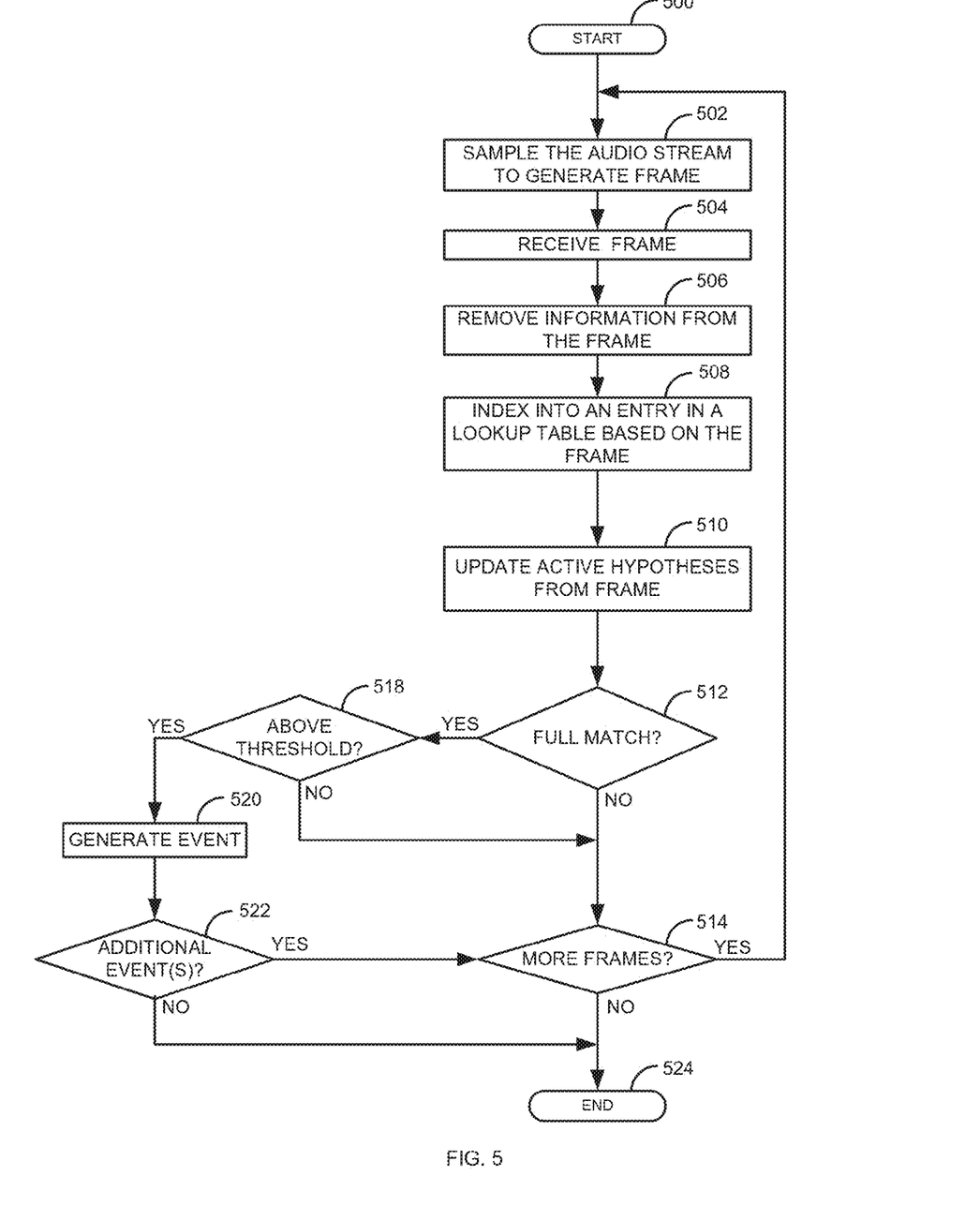
FIG. 5 is a flow diagram of a process for searching an audio signal.
Figure 6:
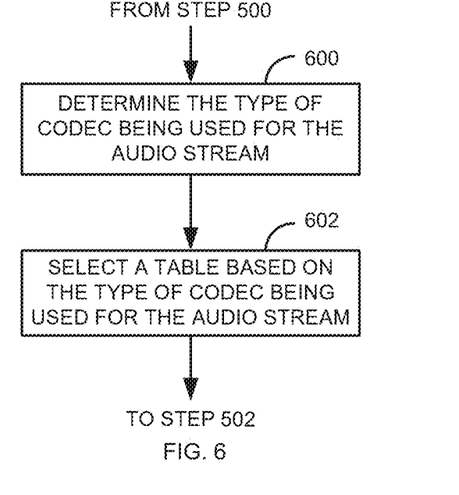
FIG. 6 is a flow diagram of a process for selecting a lookup table based on a type of codec being used in an audio signal.
Figure 7:
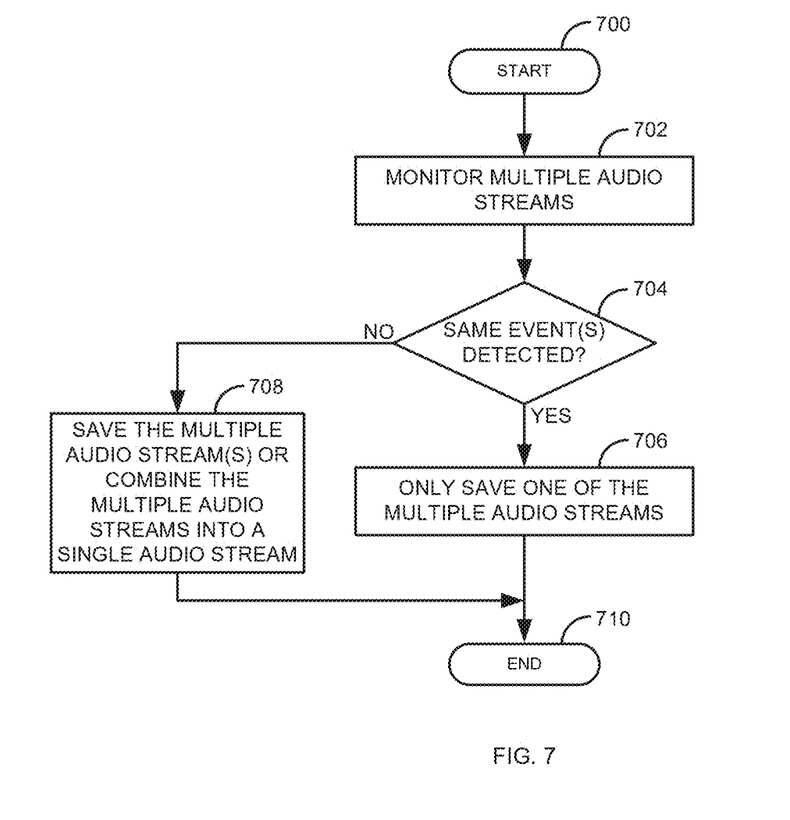
FIG. 7 is a flow diagram of a process for monitoring events in multiple audio signals.

FIG. 5 is a flow diagram of a process for searching an audio signal. Illustratively, the communication devices 101A-101N, the communication system 120, the audio signal monitor 121, the sound analyzer 122, the event detector 123, and the codecs 125 and 325 are stored-program-controlled entities, such as a computer or processor, which performs the method of FIGS. 5-7 and the processes described herein by executing program instructions stored in a tangible computer readable storage medium, such as a memory or disk. Although the methods described in FIGS. 5-7 are shown in a specific order, one of skill in the art would recognize that the steps in FIGS. 5-7 may be implemented in different orders and/or be implemented in a multi-threaded environment. Moreover, various steps may be omitted or added based on implementation.

The process starts in step 500. The process samples an audio stream to generate a frame in step 502. Alternatively, as described in relationship to FIG. 3, the frame may be extracted from a codec bitstream. The frame is received in step 504.

The process can optionally remove information from the frame in step 506. The process can remove information from the frame that is not used in matching sound model elements. For example, based on G.729A encoding there are 80 bits associated with each frame. Direct use of this would require 2 to the power of 80 indexes or lookup tables 221/321. To reduce the number of indexes, the process can make use of the known structure of the frame. In particular, in G.729A only 18 bits of each frame are used to encode the "linear prediction" parameters that convey much of the information about the identities of speech sounds. This reduces the number of indexes to a much more practical level, in particular to a level at which the lookup tables 221/321 can be derived from a reasonable (e.g., 20 hours) set of data samples of voice for the specific language. In one embodiment, a discrete hidden Markov model may be used to derive the lookup tables 221/321. A similar process can be used for other codecs that are based on linear prediction analysis.

The process used to derive the lookup tables 221/321 (for example, discrete hidden Markov model training, known in the art) can be arranged to merge groups of similar lookup tables, resulting in a reduced overall memory footprint. A sequence of frames accessing the same lookup table 221/321 will have similar effects and the system may be modified so that only a single, representative, frame is used, saving computation time when such a sequence is encountered. Alternatively, the process can remove frames that are deemed to be similar to other frames, such as previously received frames that do not match a set of phonemes or sound parts in the word, phrase, or sound bite. Frames that are similar can index into the same entry in the lookup table. This also reduces the size of the lookup table.

In another embodiment, the process can dynamically (or at the start) create a list of indexes that do not contain any of the sound model elements included in the items being searched for. Frames that index into that list of indexes can be ignored. In another embodiment, the process can remove frames that do not contain a level of sound.

For each new frame received, the process derives an index into the set of lookup tables 400. The process indexes into an entry in the corresponding lookup table 400 based on the frame in step 508. The lookup table 400 contains distance/likelihood for each possible sound model element. At step 510 these distances are used to initiate a possible new match hypothesis and to update currently active hypotheses as described in relation to FIG. 1. At step 512 the process determines whether there are any active hypotheses corresponding to a full match for the sound bite, the word, and/or the phrase. If there is a full match and the likelihood is above the threshold in step 518, the process generates a match event at step 520

The event can be any type of event that can be associated with detection of a sound bite, word, and/or phrase in the audio stream. For example, the event can be to notify an agent in a contact center of the detection of the word and/or phrase, notify a supervisor in a contact center of the detection of the word and/or phrase, logging the detection of the event in a database, conferencing a new user into a voice/video call, forwarding/transferring a voice/video call to a new user, and/or the like.

In one embodiment, the event is to transfer a voice/video call to an Interactive Voice Response System (IVR). This allows a user to provide input that can be collected. For example, a caller may be directed to the IVR to fill out a survey based on the word, phrase, or sound bite.

In one embodiment, the event can be to switch the voice/video call to use a different codec. For example, if the audio stream contains the phrase "bad connection," the system can change to a higher resolution codec (assuming both ends of the call support the higher resolution codec). Alternatively, if an unusual amount of background noise is detected (e.g., during a silence period), the system can change the voice stream to use a higher resolution codec (or just a different codec). Alternatively, if the system detects low background noise (a sound bite), the system can change to a lower resolution codec.

In one embodiment, the generated event may be to search for a second word or phrase in the audio stream. For example, the first word may be "failure." Once the word "failure" is detected in the audio stream, the system then looks for specific terms associated with the word failure. For instance, the system can look to detect the word "Product X" and/or "Product Y" in the audio stream. A timer can be used in association with the detection of the second word or phrase. For example, if the second word or phrase is not detected within 20 seconds, the event in step 520 is not generated and the process looks for the word "failure" again. This process can also be used to detect sound bites and/or a combination of sound bites and words/phrases.

In one embodiment, the event may to be to retrieve a document. For example, a user can call into Interactive Voice Response (IVR) and say the words "I want a copy of document X." Alternatively, the event may be to transfer the call or authenticate the user.

The process determines in step 522 if there are additional event(s) to be searched for. The additional event(s) may be the same event and/or a different event. If there are not any additional events in step 522, the process ends in step 524. Otherwise, if there are additional event(s) in step 522, the process goes to step 514.

If the determined full match score is not above the threshold in step 518 or there are additional event(s) in step 522, the process determines if there are more frames in the audio stream in step 514. If there are more frames in the audio signal in step 514, the process goes to step 502. Otherwise, if there are no more frames in the audio signal in step 514, the process ends in step 524.

The above process describes detection of words, phrases, and sound bites in series. However, in other embodiments, detection of multiple words, phrases, and/or sound bites can be done in parallel. For example, the process can search for the word "bad", the phrase "this product failed", and a sound bite in parallel.

FIG. 6 is a flow diagram of a process for selecting a lookup table based on a type of codec being used in an audio signal. The process described in FIG. 6 goes between step 500 and step 502 of FIG. 5. After starting in step 500, the process determines the type of codec being used for the audio stream in step 600. Once the type of codec is determined, the process selects a table (e.g., table 220 or 320) associated with the codec being used for the audio stream in step 602. The process then goes to step 502.

To illustrate, consider the following example. Assume that the system supports codec protocols G.729, G.729A, and G.723.1 and has a respective table for each protocol. The process determines in step 602 that the audio signal is encoded using the G.729A protocol. Upon detection of the frames being encoded using the G.729A protocol, the process selects a table associated with the G.729A protocol from the three tables in step 602. For a second audio signal, the process detects that the frames are encoded according to the G.723.1 protocol in step 600. The process selects a table associated with the G.723.1 protocol in step 602.

FIG. 7 is a flow diagram of a process for monitoring events in multiple audio signals. The process starts in step 700. The process monitors multiple audio steams, such as a stereo audio stream for a music stream or audio stream in step 702. The process determines in step 704 if the same event is detected at the same time in step 704. If the event is detected at the same time in step 704, the process saves only one of the audio streams in step 706. The process ends in step 710.

Otherwise, if the process determines that the same event is not detected at the same time in the audio streams in step 704, the process saves the multiple audio streams or combines the multiple audio streams into a single audio stream in step 708. The process then ends in step 710. This process can be extended to save portions of an audio stream where one event is in both channels and another event is in only one channel.

The main purpose is to reduce the amount of data saved for an audio stream if the detected events occur at the same time in more than one channel of the audio stream. If the event is only detected in a single channel of the audio stream, the process saves both files.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for analyzing an audio signal comprising:
   receiving, by a microprocessor, a plurality of frames of the audio signal, wherein the audio signal is a live audio stream that was previously converted, by a type of codec, from an analog audio signal, into the plurality of frames of the audio signal;
   determining, by the microprocessor, the type of the codec used to generate the plurality of frames;
   in response to determining the type of codec used to generate the plurality of frames, selecting, by the microprocessor, a lookup table from a plurality of lookup tables based on the type of codec;
   indexing, by the microprocessor, into a plurality of entries in the lookup table based on the plurality of frames, wherein the plurality of entries in the lookup table indicate a likelihood of the plurality of frames matching a plurality of sound model elements;
   deriving, by the microprocessor, from the plurality of indexed lookup table entries, a match score for each of a plurality of sound bites, words, or phrases that are being searched for in the audio signal;
   determining, by the microprocessor, that the match score is above a threshold; and
   in response to determining that the match score is above the threshold, generating, by the microprocessor, an event.

2. The method of claim 1, wherein the audio signal is a live voice communication between two communication devices and wherein the event is at least one of the following:
   notifying an agent, via an agent communication device of a detection of the word or phrase;
   notifying a supervisor, via a supervisor communication device of the detection of the word or phrase;
   logging a detection of the event in a database;
   conferencing a user communication device, of a new user into a voice/video call;
   transferring a voice/video call to an Interactive Voice Response System (IVR);
   forwarding/transferring a voice/video call to the user communication device;
   searching for a new sound bite, word or phrase; or
   switching to a different codec.

3. The method of claim 1, wherein the plurality of entries in the lookup table comprise identifiers for sound model elements for a specific spoken language.

4. The method of claim 1, wherein the audio signal is a voice communication between a user communication device and an Interactive Voice Response (IVR) system and wherein the event is at least one of:
   retrieval of a document;
   transferring of the voice communication; or
   authentication of the user.

5. The method of claim 1, further comprising at least one of:
   removing, by the microprocessor, information from at least one of the plurality of frames that is not used in searching for the plurality of sound model elements;
   ignoring, by the microprocessor, at least one of the plurality of frames that is deemed to be similar; or
   ignoring, by the microprocessor, at least one of the plurality of frames that does not contain a level of sound.

6. The method of claim 1, wherein the audio signal comprises a plurality of audio signals and further comprising:
   detecting, by the microprocessor, one of the sound bites, words, or phrases at the same point in time in the plurality of audio signals; and
   in response to detecting the one of the sound bites, words, or phrases at the same point in time in the plurality of audio signals, only storing, by the microprocessor, one of the plurality of audio signals.

7. A system for analyzing an audio signal comprising:
   a microprocessor; and
   a computer readable medium, coupled with the microprocessor and comprising microprocessor readable and executable instructions that program the microprocessor to execute:
   an audio signal monitor that receives a plurality of frames of the audio signal, determines a type of the codec used to generate the plurality frames, wherein the audio signal was previously converted, by the type of codec, from an analog audio signal into the plurality of frames of the audio signal;
   a sound analyzer that selects a lookup table from a plurality of lookup tables based on the type of codec in response to determining the type of codec used to generate the plurality of frames, indexes into a plurality of entries in the lookup table based on the plurality of frames, wherein the plurality of entries in the lookup table indicate a likelihood of the plurality of frames matching a plurality of sound model elements, derives, from the plurality of indexed lookup table entries, a match score for each of a plurality of sound bites, words, or phrases that are being searched for in the audio signal, and determines that the match score is above a threshold; and
   an event detector that generates an event in response to determining the match score is above the threshold.

8. The system of claim 7, wherein the audio signal is a live voice communication between two communication devices and wherein the event is at least one of the following:
   notifying an agent, via an agent communication device of a detection of the word or phrase;
   notifying a supervisor, via a supervisor communication device of the detection of the word or phrase;
   logging a detection of the event in a database;
   conferencing a new user communication device into a voice/video call;
   transferring a voice/video call to an Interactive Voice Response System (IVR);

forwarding/transferring a voice/video call to the new user communication device;
searching for a new sound bite, word or phrase; or
switching to a different codec.

9. The system of claim 7, wherein the plurality of entries in the lookup table comprise identifiers of the plurality of sound model elements for a specific spoken language.

10. The system of claim 7, wherein the audio signal is a voice communication between a user communication device and an Interactive Voice Response system and wherein the event is at least one of:
retrieval of a document;
transferring of the voice communication; or
authentication of the user.

11. The system of claim 10, wherein the event is the retrieval of the document.

12. The system of claim 7, wherein the audio signal monitor does at least one of the following:
removes information from at least one of the plurality of frames that is not used in searching for the plurality of sound model elements;
ignores at least one of the plurality of frames that is deemed to be similar; or
ignores at least one of the plurality of frames that does not contain a level of sound.

13. The system of claim 7, wherein the audio signal comprises a plurality of audio signals and wherein the sound analyzer:
detects one of the sound bites, words, or phrases at the same point in time in the plurality of audio signals; and
only stores one of the plurality of audio signals in response to detecting the one of the sound bites, words, or phrases at the same point in time in the plurality of audio signals.

14. A system for analyzing an audio signal comprising:
a microprocessor; and
a computer readable medium, coupled with the microprocessor and comprising microprocessor readable and executable instructions that program the microprocessor to execute:
an audio signal monitor that receives a plurality of frames of the audio signal, wherein the audio signal is converted, by a type of codec, from an analog signal into the plurality of frames, wherein the audio signal is a live voice communication between two communication devices on a network;
a sound analyzer that indexes into a plurality of entries in a lookup table based on the plurality of frames, wherein the plurality of entries in the lookup table indicate a likelihood of the plurality of frames matching a plurality of sound model elements, derives, from the plurality of indexed lookup table entries, a match score for each of a plurality of sound bites, words, or phrases that are being searched for in the audio signal, and determines that the match score is above a threshold; and
an event detector that generates an event in response to determining the match score is above the threshold, wherein the event is at least one of the following:
notifying an agent, via an agent communication device of a detection of the word or phrase;
notifying a supervisor, via a supervisor communication device of the detection of the word or phrase;
logging a detection of the event in a database;
conferencing a new user communication device into a voice/video call;
transferring a voice/video call to an Interactive Voice Response System (IVR);
forwarding/transferring a voice/video call to the new user communication device;
searching for a new sound bite, word or phrase; or
switching to a different codec.

15. The system of claim 14, wherein the at least one event comprises notifying the agent communication device of the detection of the word or phrase.

16. The system of claim 14, wherein the at least one event comprises switching to the different codec.

17. The system of claim 14, wherein the at least one event comprises searching for the new sound bite, word, or phrase.

18. The system of claim 14, wherein the at least one event comprises transferring the voice/video call to the IVR system.

19. The system of claim 14, wherein the at least one event comprises forwarding/transferring the voice/video call to the new user communication device.

20. The system of claim 14, wherein the at least one event comprises conferencing the new user communication device into the voice/video call.

* * * * *